W. M. TIERNAN & H. M. SCHREIBER.
HARROW CONNECTION.
APPLICATION FILED JULY 21, 1909. RENEWED DEC. 21, 1910.

987,838.

Patented Mar. 28, 1911.

Attest:
Erle W Miller
H. G. Sweet.

Inventors:
William M. Tiernan and
Henry M. Schreiber,
By J. Elswerk Atty

THE NORRIS PETERS CO., WASHINGTON, D. C.

UNITED STATES PATENT OFFICE.

WILLIAM M. TIERNAN AND HENRY M. SCHREIBER, OF ROLFE, IOWA.

HARROW CONNECTION.

987,838. Specification of Letters Patent. Patented Mar. 28, 1911.

Application filed July 21, 1909, Serial No. 508,826. Renewed December 21, 1910. Serial No. 598,648.

*To all whom it may concern:*

Be it known that we, WILLIAM M. TIERNAN and HENRY M. SCHREIBER, citizens of the United States of America, and residents of Rolfe, Pocahontas county, Iowa, have invented a new and useful Harrow Connection, of which the following is a specification.

The object of this invention is to provide improved means for connecting harrow sections.

A further object of this invention is to provide improved means for connecting harrow sections and attaching draft devices thereto so that one of said sections may be turned in an orbit around the other section and further so that the several harrow sections will conform to irregularities in the surface of the ground over which they travel.

Our invention consists in the construction, arrangement and combination of elements hereinafter set forth, pointed out in our claims and illustrated by the accompanying drawing, in which—

Figure 1:
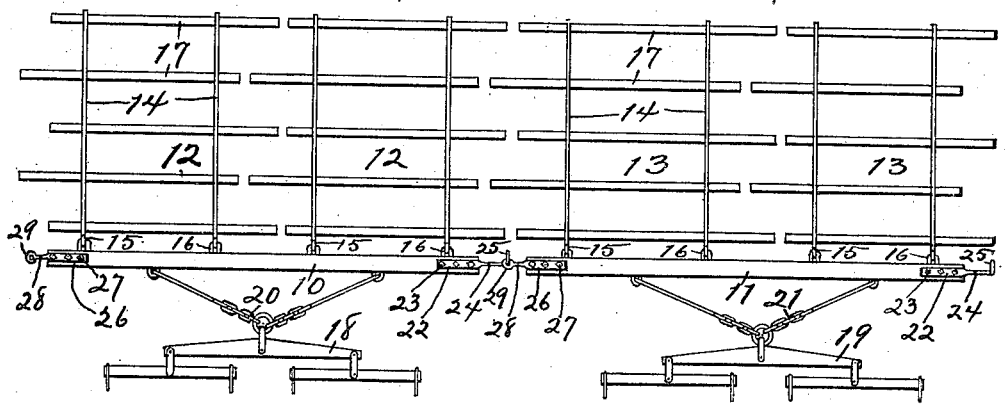
Figure 2:
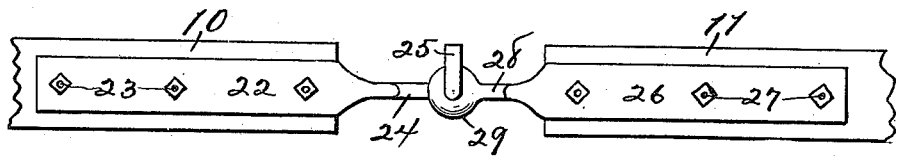
Figure 3:
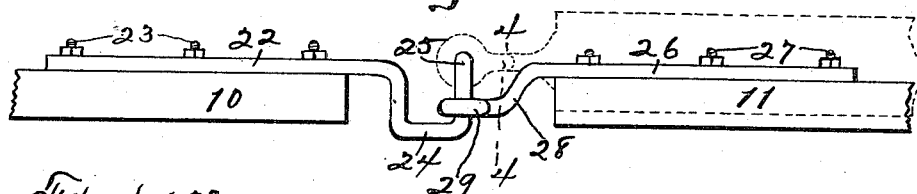
Figure 4:
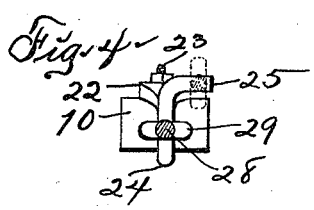

Figure 1 is a plan of a complete harrow embodying our invention. Fig. 2 is a detail plan, on an enlarged scale, of the means employed to connect sections of the harrow. Fig. 3 is a front elevation, on an enlarged scale, of the elements shown in Fig. 2, dotted lines indicating the position of one of the parts at one stage of the operation of connecting or disconnecting the parts. Fig. 4 is a cross-section on the indicated line 4—4 of Fig. 3.

In the construction of the device as shown the numerals 10, 11 designate draft bars, which may vary in number and dimension as desired, two of them being shown in this instance as fully illustrating the construction and use thereof. One or more harrow sections 12, 13 are hinged to and drag behind the draft bars 10, 11. The harrow sections 12, 13 are composed of longitudinal bars 14 hinged on horizontal axes at their forward ends by means of hooks 15 thereon loosely engaging in eyes 16 on the draft bars, and cross bars 17 fixed to the longitudinal bars and adapted to carry teeth (not shown) of common form. Any desired number of sections 12, 13 may be employed in connection with a single draft bar and by the construction described the draft bar can be attached to or detached from the harrow sections readily by movement of said bar through an arc relative to the hooks 15. Swingletrees 18, 19 may be attached to the draft bars 10, 11 in any desired manner, such as by attaching devices 20, 21. The bar 10 is formed with connecting members of different construction on and projecting longitudinally from its ends. The bar 11 also is provided with connecting members identical with those on the bar 10 and each additional draft bar employed in a given harrow is similarly equipped. One of the connecting members of the bar 10 is adapted to interengage with a mating connecting member on the bar 11 and in like manner the other connecting members of said bars are adapted to interengage with mating members of other bars of like character not shown. One of the connecting members on each bar comprises a shank 22 preferably arranged in contact with the upper surface of the bar and secured thereto by bolts 23 extending through the shank and bar; a neck 24 offset downwardly out of the plane of the shank 22 and preferably circular in cross-section; and a hook 25 extending upwardly and rearwardly from the extremity of the shank 24 and also preferably circular in cross-section. The extremity of the hook 25 preferably is directed rearwardly. The mating connecting member of each bar is formed of a shank 26 preferably arranged on the upper surface of the bar and secured thereto by bolts 27 extending through the shank and bar; a neck 28 offset downwardly from the shank; and an eye 29, having a vertical opening, formed on the extremity of the shank 28 and adapted to embrace and loosely pivoted on the hook 25. The bars are connected as shown by movement of the bar 11 through an arc forwardly so that the eye 29 may receive the hook 25 and travel to a seat adjacent to the point of juncture of said hook with the neck 24, at which time the bars 10, 11 are in the same horizontal plane and in longitudinal alinement transversely of the path of travel of the harrow.

The harrow is advanced over the surface of the ground by draft animals attached to the swingle-trees 18, 19 or by any other desired means. During the travel of the harrow the sections 12, 13 thereof articulate on the bars 10, 11 by reason of the interengaging hooks 15 and eyes 16; the bars 10, 11 may oscillate or articulate relative to each other on horizontal axes because of the loose engagement of the eye 29 with the hook 25, thus providing that the sections 12, 13 may conform to uneven surfaces on transverse lines; and the bars 10, 11 may articulate relative to each other on vertical axes because of the pivotal engagement of the vertical portion of the hook 25 in the eye 29, thus providing means for advancing one draft bar relative to the other on an arc. The latter provision is desirable in turning the harrow to reverse the direction of travel thereof or to arrange for travel on a line at right angles to the line first traveled, in that it permits of drawing one draft bar and its sections around the other draft bar and its sections through any part of a circle relative thereto.

We claim as our invention—

In harrow connections, a draft bar having an eye member on one end and a hook member on the opposite end, the hook member comprising a shank, a neck and a rearwardly opening hook, and the eye member comprising a shank, a neck and an eye, means for applying draft to said bar, and harrow sections attached to said bar.

Signed by us at Rolfe, Iowa this 19th day of June, 1909.

WILLIAM M. TIERNAN.
HENRY M. SCHREIBER.

Witnesses:
J. H. CHARLTON,
J. H. BRINKMAN.

Copies of this patent may be obtained for five cents each, by addressing the "Commissioner of Patents, Washington, D. C."